(12) United States Patent
Berger et al.

(10) Patent No.: US 11,368,047 B2
(45) Date of Patent: Jun. 21, 2022

(54) MULTI-MODE UPS SYSTEM WITH AN IMPROVED ENERGY SAVER MODE

(71) Applicant: Eaton Intelligent Power Limited, Dublin (IE)

(72) Inventors: Jan-Erik Berger, Helsinki (FI); Tuomo Kohtamaeki, Helsinki (FI); Anders Sjoeberg, Espoo (FI)

(73) Assignee: Eaton Intelligent Power Limited, Dublin (IE)

( * ) Notice: Subject to any disclaimer, the term of this patent is extended or adjusted under 35 U.S.C. 154(b) by 87 days.

(21) Appl. No.: 16/624,311

(22) PCT Filed: Jun. 7, 2018

(86) PCT No.: PCT/EP2018/064963
§ 371 (c)(1),
(2) Date: Dec. 19, 2019

(87) PCT Pub. No.: WO2018/234046
PCT Pub. Date: Dec. 27, 2018

(65) Prior Publication Data
US 2021/0152017 A1 May 20, 2021

(30) Foreign Application Priority Data
Jun. 19, 2017 (GB) ..................................... 1709695

(51) Int. Cl.
*H02J 9/06* (2006.01)
*H02J 3/32* (2006.01)

(52) U.S. Cl.
CPC ................ *H02J 9/062* (2013.01); *H02J 3/32* (2013.01)

(58) Field of Classification Search
CPC .................................... H02J 9/062; H02J 3/32
USPC ...................................................... 307/66, 64
See application file for complete search history.

(56) References Cited

U.S. PATENT DOCUMENTS

| | | | |
|---|---|---|---|
| 6,295,215 B1 | 9/2001 | Akbari et al. | |
| 2005/0043859 A1 | 2/2005 | Liu et al. | |
| 2006/0290205 A1* | 12/2006 | Heber | H02J 9/062 307/65 |

(Continued)

FOREIGN PATENT DOCUMENTS

| | | |
|---|---|---|
| EP | 1928081 A2 | 6/2008 |
| WO | WO 2014201309 A1 | 12/2014 |
| WO | WO 2015016944 A1 | 2/2015 |

*Primary Examiner* — Michael R. Fin
(74) *Attorney, Agent, or Firm* — Leydig, Voit & Mayer, Ltd.

(57) ABSTRACT

An uninterruptible power supply (UPS) system operable in an energy saver mode includes: a static bypass switch connected between an input connector and an output connector of the UPS system and being activatable to operate the UPS system in the energy saver mode; a plurality power modules, each of the plurality of power modules being connected between the input connector and the output connector of the UPS system and at least some of the plurality of power modules being controllable for a reactive power compensation; and a controller for controlling one or more of the controllable power modules depending on a data input related to a reactive power compensation. The controller controls one or more of the controllable power modules depending on the data input such that a reactive power flow via the UPS system is adjusted.

8 Claims, 3 Drawing Sheets

(56) References Cited

U.S. PATENT DOCUMENTS

| | | |
|---|---|---|
| 2012/0181871 A1 | 7/2012 | Johansen et al. |
| 2013/0116946 A1* | 5/2013 | Familiant ............... H02J 3/00 |
| | | 702/58 |
| 2014/0361624 A1* | 12/2014 | Ault ..................... H02J 9/062 |
| | | 307/65 |
| 2014/0368042 A1 | 12/2014 | Furlan et al. |
| 2019/0067988 A1* | 2/2019 | Ghosh ................... H02M 1/14 |

* cited by examiner

MULTI-MODE UPS SYSTEM WITH AN IMPROVED ENERGY SAVER MODE

CROSS-REFERENCE TO PRIOR APPLICATIONS

This application is a U.S. National Phase application under 35 U.S.C. § 371 of International Application No. PCT/EP2018/064963, filed on Jun. 7, 2018, and claims benefit to British Patent Application No. GB 1709695.9, filed on Jun. 19, 2017. The International Application was published in English on Dec. 27, 2018 as WO 2018/234046 under PCT Article 21(2).

FIELD

This specification relates to a multi-mode UPS (Uninterruptible Power Supply) system, which can be operated in an energy saver mode.

BACKGROUND

FIG. 1 shows a block diagram of a typical multi-mode UPS system 10 comprising a rectifier 12, an inverter 13, a battery converter 14, and a silicon controlled rectifier (SCR) 11. The UPS system 10 comprises an input connector for connecting it to a power supply system such as a grid 15, a battery connector for coupling the UPS system 10 to one or more rechargeable batteries 16, and an output connector for connecting it to a load 17. The input connector and the output connector can be provided either for one, 3-phase or generally a multi-phase power supply. Power supply fed to the input connector can come from separate power sources or from a shared power source.

The UPS system 10 can be operated in several different modes.

In a double conversion mode, the rectifier 12 generates a DC (direct current) link voltage from the voltage supplied to the input connector, and the inverter 13 generates an output AC (alternate current) voltage from the DC link voltage. The battery converter 14 uses the DC link voltage to charge the one or more batteries 16. During a power outage, the battery converter 14 maintains the DC link voltage while the inverter 13 continues to operate like in double conversion mode.

The UPS system 10 can also be put on bypass for maintenance purposes or because of a failure. In this so-called bypass mode, the UPS system 10 provides mains current directly to the load 17 through the SCR 11. In bypass mode, the load 17 is however not protected from power outages.

The UPS system 10 can also support an energy saver mode. In such mode, the UPS system 10 provides mains current directly to the load 17 through the SCR 11, and the DC link voltage is taken from the output connector. The inverter 13 and the rectifier 12 are commanded off to save power. However, when the bypass voltage goes out of its limits or there is some other condition preventing switching the UPS system 10 into the energy saver mode, the UPS system 10 immediately transfers back to double conversion mode to protect the load 17. The main reason for using the energy saver mode is the improved operation efficiency.

The input power factor of the UPS system 10 may incur a problem in the energy saver mode. In the double conversion mode, the rectifier 12 can control the input power factor and depending on the design of the UPS system 10, the amount of reactive current can be close to zero. In the energy saver mode, the UPS system 10 has no control over the power factor, and the load 17 connected to the UPS output, which may draw reactive power, may cause a lower power factor on the UPS input connector. Capacitors at the input of the rectifier 12 and at the output of the inverter 13 may also draw reactive current and, thus, may contribute to a lower power factor of the UPS system 10.

The international patent application WO2014201309A1 discloses a multi-mode UPS system, which is operable in an economy mode like the above described energy saver mode. In the economy mode, at least one of the rectifier and the inverter of the UPS system is activated, and that at least one of the rectifier and the inverter is operable to perform at least one of DC voltage regulation, reactive power compensation, and active damping.

The U.S. Pat. No. 6,295,215 B1 relates to power supply apparatus and methods of operation thereof, and more particular, to AC power supply apparatus and methods. Disclosed is a power supply apparatus which includes a multi-mode DC/AC converter circuit that provides a first component of power, for example, a real power component, while a bypass circuit provides a second component of power, for example, a harmonic power component and/or a reactive power component, to the load from an AC power source. The DC/AC converter circuit may include a current mode controlled inverter that provides reactive and harmonic currents to the load such that the bypass circuit predominantly transfers real power between the AC source and the load. In this manner, power factor and other power quality parameters at the AC source may be maintained at desired levels.

The US patent application US 2005/043859 A1 relates to a modular uninterruptible power supply system and control method thereof, in particular to a system of parallel UPS modules all with full uninterruptible power supply capabilities, and identical control logic and functional capabilities for initiating role detection dynamically and electing a virtual master through the arbitration process to control the parallel operation of UPS modules. The system design has incorporated the characteristics of both centralized control and distributed processing by dispensing with a dedicated control module, and is able to operate with one or more UPS modules in parallel, providing fault tolerance and maximum redundancy, and reducing the risks of system-level single point failure to minimum possibility to the emergent and sensitive load.

The US patent application US 2012/181871 A1 relates generally to control of an uninterruptible power supply. Disclosed is an uninterruptible power supply (UPS) that may include an inverter, a controller, and a bypass switch. In a bypass mode of operation, the controller operates the bypass switch to provide power at the uninterruptible power supply output from an input power source via the bypass switch. The controller can also operate the inverter during online operation to regulate the inverter output voltage and to provide output voltage from the inverter at the UPS output when bypass operation is interrupted. The controller can also operate the inverter during bypass and other operation modes to provide, among other things, power factor correction, harmonic current distortion control, and active power to charge a backup power source. In some embodiments, the controller operates the inverter to provide reactive power control and power factor correction.

SUMMARY

In an embodiment, the present invention provides an uninterruptible power supply (UPS) system operable in an energy saver mode, comprising: a static bypass switch connected between an input connector and an output connector of the UPS system and being activatable to operate the UPS system in the energy saver mode; a plurality power modules, each of the plurality of power modules being connected between the input connector and the output connector of the UPS system and at least some of the plurality of power modules being controllable for a reactive power compensation; and a controller configured to control one or more of the controllable power modules depending on a data input related to a reactive power compensation, the controller being configured to control one or more of the controllable power modules depending on the data input such that a reactive power flow via the UPS system between a power supply connected to the input connector and a load connected to the output connector is adjusted according to a required reactive power compensation when the UPS system is operated in the energy saver mode, the controller being configured to determine a required reactive power compensation based on the data input and to determine a number of active power modules for obtaining the required reactive power compensation.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
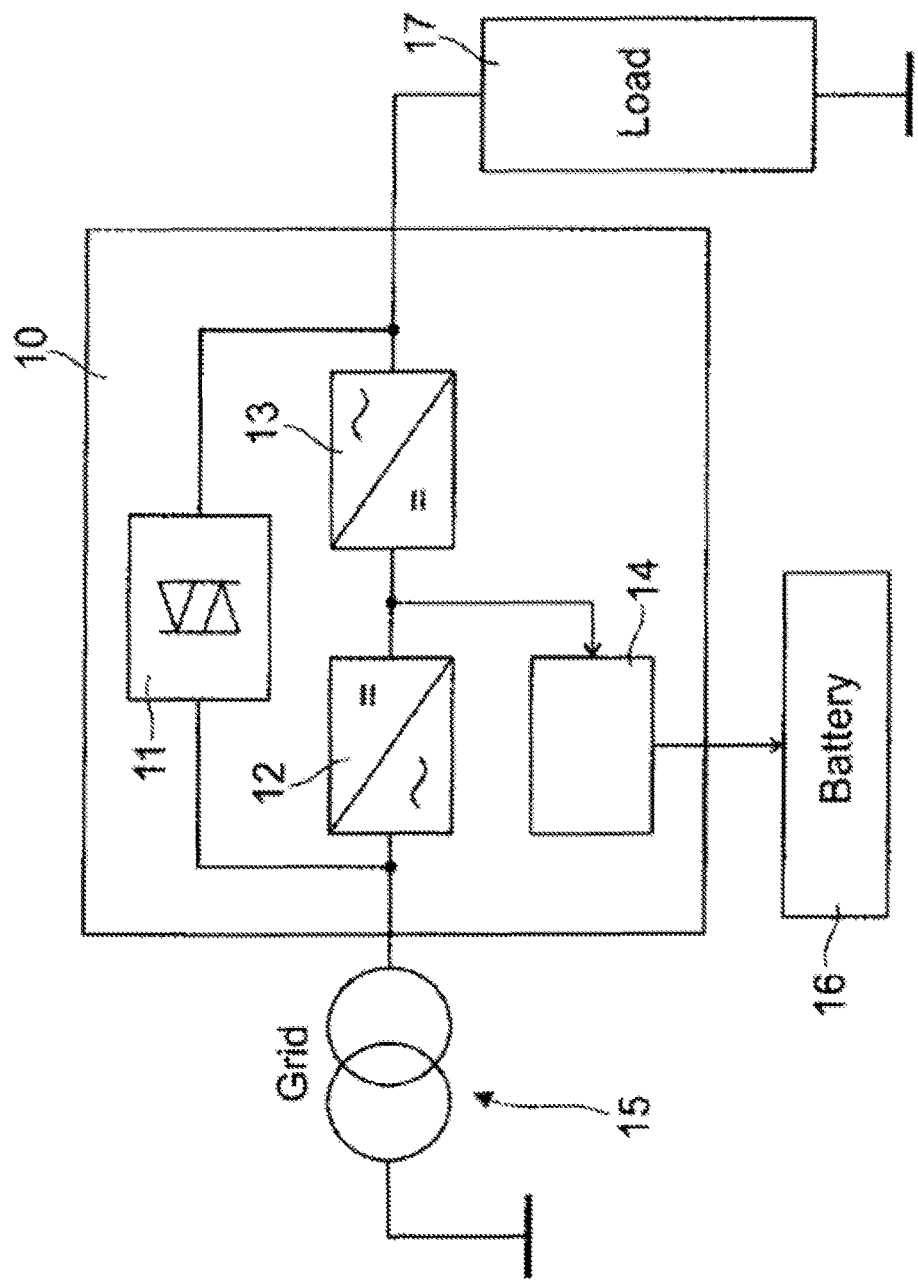
FIG. 1 shows a block diagram of a prior-art multi-mode UPS system.

In an embodiment, the present invention provides an improved multi-mode UPS system.

According a first aspect, an improved UPS system being operable in an energy saver mode comprises several power modules each being connected between the input connector and the output connector of the UPS system and at least some of the power modules being controllable for a reactive power compensation. The reactive power compensation may be performed depending on a data input related to a reactive load compensation.

According to a first embodiment, a UPS system operable in an energy saver mode is disclosed. The system comprises a static bypass switch being connected between an input connector and an output connector of the UPS system and being activatable to operate the UPS system in the energy saver mode, several power modules each being connected between the input connector and the output connector of the UPS system and at least some of the power modules being controllable for a reactive power compensation, and a controller being configured to control one or more of the controllable power modules depending on a data input related to a reactive power compensation, the controller being configured to control the one or more of the controllable power modules depending on the data input such that a reactive power flow via the UPS system between a power supply connected to the input connector and a load connected to the output connector is adjusted according to a required reactive power compensation when the UPS system is operated in the energy saver mode.

the controller being configured to determine the required reactive power compensation based on the data input and to determine a number of active power modules for obtaining the required reactive power compensation.

In some embodiments, the controller may be configured to determine the number of active power modules by rounding up the result of the following equation to the next integer value: number of active power modules=required reactive power compensation/maximum reactive power compensation per power module.

In some embodiments, the data input may comprise one or more of the following data: a configured reactive load compensation requirement; a defined UPS system equivalent capacitance; a reactive power on the input side of the UPS system and/or a power factor.

In some embodiments, the controller may be configured to calculate a required reactive power compensation based on one or more of the data comprised by the data input.

In some embodiments, at least one of the controllable power modules may comprise reactive power compensation device being controllable by the controller.

In a specific embodiment, the reactive power compensation device may comprise a rectifier and an inverter being connected in series between the input connector and the output connector of the UPS system, and at least one of the rectifier and the inverter being controllable by the controller.

In some embodiments, the system may comprise measurement unit for measuring the reactive power flow via the UPS system and/or the power factor of the system comprising the UPS system and a load connected to the output connector of the UPS system.

According to a second aspect, a method for operating a UPS system in an energy saver mode is disclosed, the method comprising the steps of obtaining data for determining a required reactive power compensation, determining the required reactive power compensation depending on the obtained data, determining a number of power modules of the UPS system for the determined required reactive power compensation, and controlling the determined number of power modules for achieving the determined required reactive power compensation.

In the following, functionally similar or identical elements may have the same reference numerals. Absolute values are shown below by way of example only and should not be construed as limiting.

Figure 2:
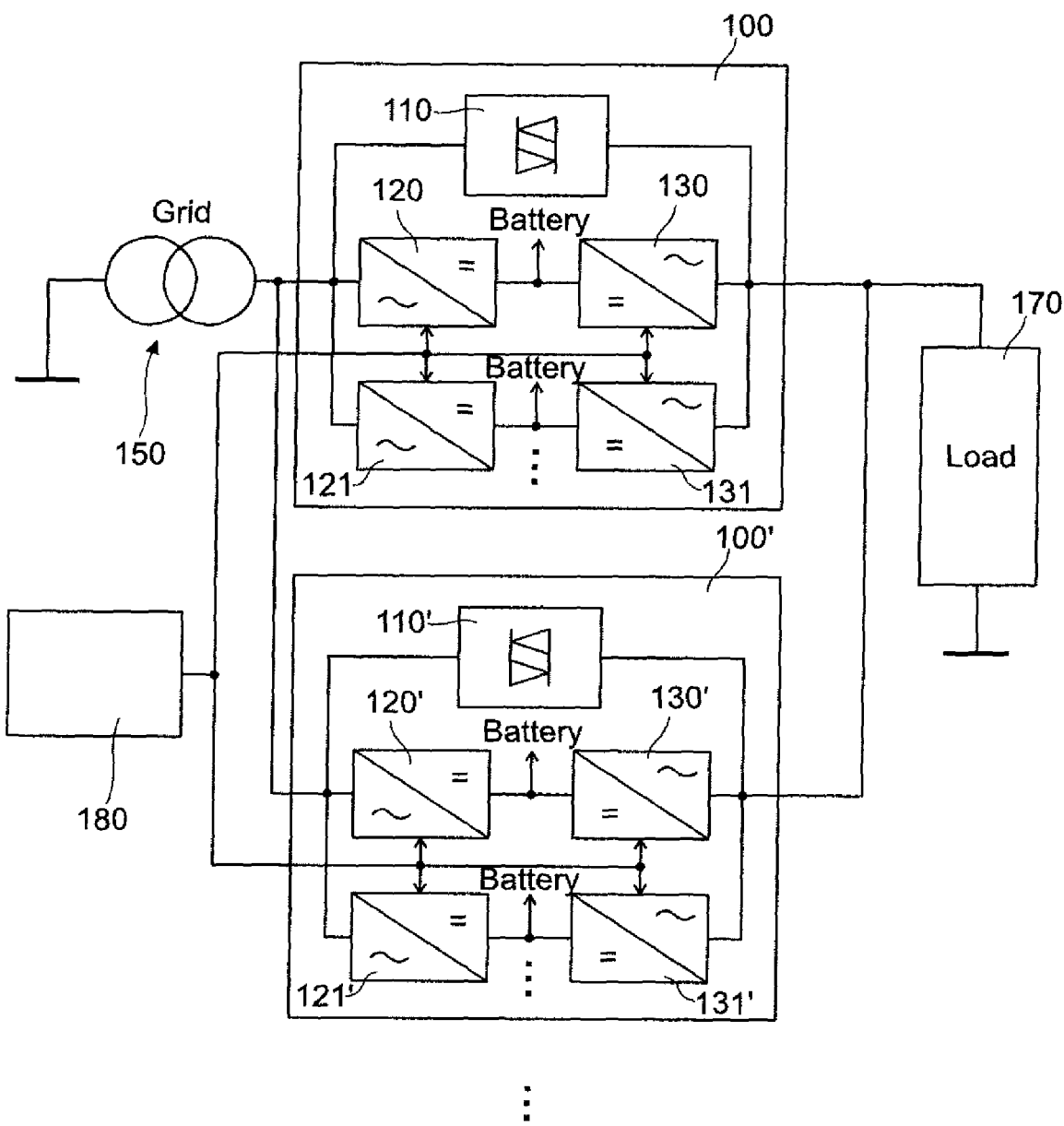
FIG. 2 shows a block diagram of an embodiment of a multi-mode UPS system.

FIG. 2 shows a block diagram of a multi-mode UPS system comprising two parallel connected UPS systems 100, 100' for supplying a load 170, for example server racks in a datacenter, being connected to the output connectors of the UPS systems 100, 100'. The input connectors of both UPS systems 100, 100' are connected to power supply means such as the grid 150.

Both UPS systems 100, 100' may be identically implemented, i.e. may comprise identical elements. In the following, only the implementation of the UPS system 100 is described in detail since the implementation of system 100' is identical.

UPS system 100 comprises a SCR 110, and two or even more power modules connected in parallel to the SCR 110 between the input connector and the output connector of the UPS system 100. Each power module may comprise a series connection of a rectifier 120, 121 and an inverter 130, 131. The connection point between the rectifier 120, 121 and the inverter 130, 131 comprises a branch connection to a battery and/or battery converter like in the UPS system 10 shown in FIG. 1.

At least some of the power modules of both UPS systems 100, 100' are controllable, which means that they can be at least partly commanded off, particularly when the UPS system 100, 100' is operated in the energy saver mode. The at least partly commanding off may be implemented in that the rectifiers 120, 121 and/or inverters 130, 131 of the power modules can be activated or deactivated by means of a respective control signal.

Either a rectifier or an inverter or even both can be used for a reactive power compensation.

The control of the rectifiers and/or inverters of the controller power modules of UPS systems 100, 100' is performed by a controller 180. The controller 180 may be an element external to or separated from the UPS systems 100, 100', or it may be implemented as an internal element of one or more of the UPS systems 100, 100'. The controller 180 may be for example implemented by a stationary or mobile computing device being configured to perform control of the power modules and comprising a data communication connection with the UPS systems 100, 100', for example wired or wireless LAN connection, a USB connection, or a Bluetooth connection. The controller 180 may be also for example integrated in an internal control electronic of the UPS systems 100, 100', particularly it may be integrated together with the power modules in an integrated circuit implementing a power electronics of the UPS system. The controller 180 may be implemented by a standard processor as it is applied for example in personal computers or a microcontroller and configured by a computer program implementing a control algorithm for performing the controller tasks required for a reactive power compensation. The controller 180 may also be implemented by an ASIC or a FPGA.

When the UPS system 100, 100' is operated in the energy saver mode, the SCR 110, 110' is activated so that electrical power from the grid 150 is directly supplied to the load 170. As explained in the introductory part, the power modules of both UPS systems 100, 100' are normally commanded off in this mode to save energy. The load 170 or the UPS system 100, 100' itself, particularly the input and/or output capacitors of the power modules, may however draw reactive power Q in the energy saver mode. A goal of the reactive power compensation is to eliminate the drawn reactive power Q so that ideally only active power P flows in the input of the UPS system, which would mean an ideal power factor of 1.

For reactive power compensation, a number of the power modules is determined by the controller 180, which are not completely commanded off, but either remain activated or are merely partly commanded off, for example by deactivating the inverter or the rectifier of a power module.

The number of the power modules used for reactive power compensation versus the number of all power modules of a UPS system may depend on the following data input:

the (amount of) reactive power compensation required in the energy saver mode may be a setting that can be modified according to customer's needs; the reactive power compensation may then be constant and may try to match this predetermined setting; and/or the (amount of) reactive power compensation required in the energy saver mode may be determined depending on the reactive power drawn by the load and/or the UPS system itself, the reactive power on the UPS input, and/or the power factor of the UPS system in the energy saver mode; and the maximum reactive power compensation that can be achieved by one power module (maximum compensation per power module).

The number of the power modules required for the reactive power compensation can be calculated from the data input using the following formula:

number of active power modules=reactive power compensation/maximum compensation per power module The result of the above formula can be rounded up to the next integer value. The maximum compensation per power module may be a configurable quantity, which may be set depending on the type of power module and is known by the algorithm. Particularly, it may be a value predefined in the algorithm and defining the maximum compensation which is possible per power module.

Power modules are commanded on or off according to the result of the calculation. If it is for example calculated that two power modules are needed for the compensation, the first and the second power module of a UPS system may be commanded on while the other power modules are commanded off. A rotation function for commanding on and off power modules according to a predetermined scheme can also be used to reduce the stress for individual power modules. For example, the reactive power compensation can be switched from one power module to another, for instance monthly. For example, so that if power module one and two handled the compensation in January power module two and three will do it in February, power module three and four in March and so on.

In energy saver mode, also the input power factor of the UPS system can be controlled by adjusting the level of reactive power compensation. The UPS system may constantly monitor the power factor and adjust the level of compensation trying to achieve an optimal power factor. The number of active power modules can be calculated using the formula described above. The number of power modules commanded on can change as the reactive power drawn by the load may change. A similar power module rotation function as above described can be used.

Figure 3:
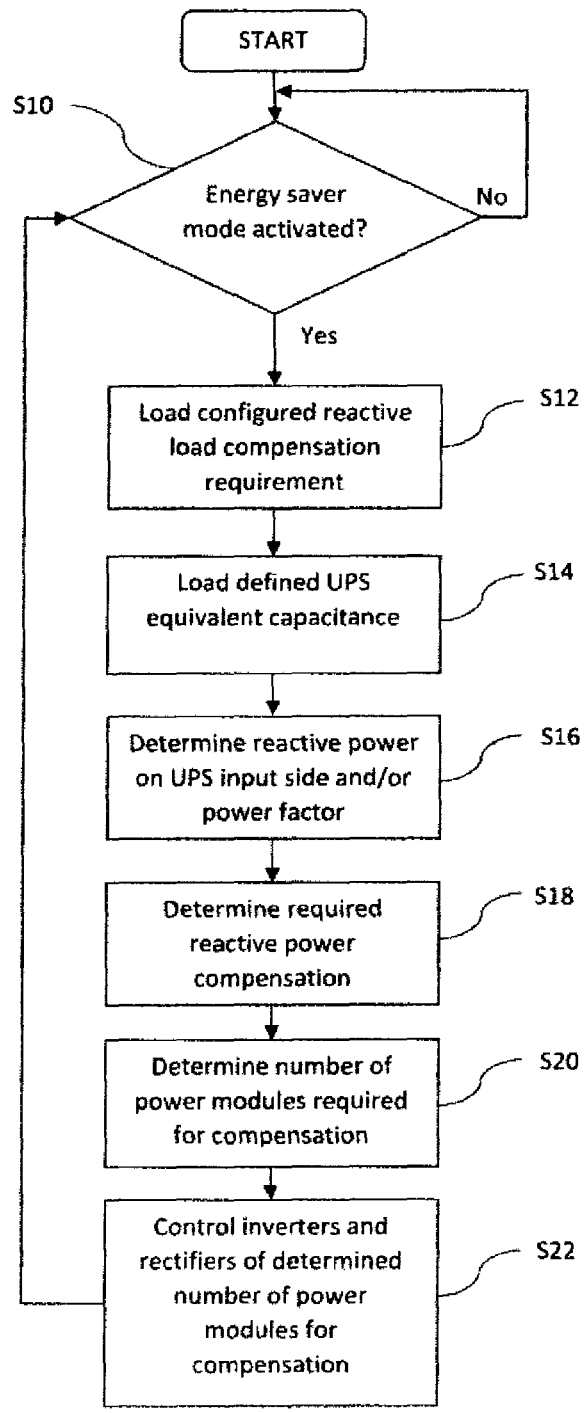
FIG. 3 shows a flowchart of an embodiment of a control program for a multi-mode UPS system.

Next, an algorithm for controlling a reactive power compensation in energy saver mode of the UPS system 100, 100' is explained in detail with reference to the flowchart shown in FIG. 3.

In step S10, the algorithm checks whether the energy saver mode of the UPS system 100, 100' is activated.

If the UPS system operates in the energy saver mode, the algorithm loads in step S12 as data input a configured reactive load compensation requirement if a corresponding setting has been input for example by a user.

In the following step S14, the algorithm loads as further data input a defined UPS equivalent capacitance which particularly corresponds to the sum capacitance of all power modules of the UPS system, particularly the sum capacitance of the input and output capacitors of the rectifiers and inverters comprised by the power modules.

The algorithm may further determine in step S16 as data input the reactive power on the input side of the UPS system and/or the power factor of the UPS system, for example by obtaining measurements of the reactive power and/or power factor as data input from measurement unit, which may be part of the entire system.

It should be noted that two of the data inputs obtained in steps S12 to S16 may be optional, which means that only one data input is required for a reactive power compensation. It should also be noted that the steps S12 to S16 can be processed in another order or even simultaneously by the algorithm.

After obtaining the data inputs in steps S12 to S16, the algorithm determines in step S18 the required reactive power compensation.

If the required reactive power compensation was input as a user setting in step S12, the algorithm can directly use the setting.

If in step S14, a defined UPS equivalent capacitance was input, the algorithm may derive therefrom the required reactive power compensation incurred by the equivalent capacitance. The derivation could be for example calculated with the following formula: $Q=C*2*pi*f*U^2$, where Q is the reactive power to be compensated (in Var), C is the equivalent capacitance (in F), f is the input frequency of the UPS power supply (in Hz), and U is the input voltage of the UPS power supply (in Volts). Since the input voltage and frequency can vary slightly, an actual measurement of the input voltage and frequency should be used in the calculation. For example, the input voltage and frequency can be constantly measured and the required reactive power compensation can be adjusted accordingly. So, the amount of the reactive power compensation based on the equivalent capacitance is not constant but almost since the UPS system usually only allows small variations in voltage and frequency. In an alternative approach, the required reactive power compensation could be calculated based on the nominal voltage and frequency of the UPS system, for example 230 V @ 50 Hz in Europe and use a constant compensation based on this.

If the algorithm determined in step S16 the actual reactive power and/or power factor, it can deduce the required reactive power compensation from these values or measurements.

In step S20, the algorithm determines the number of power modules, which are required for achieving the determined required reactive power compensation, particularly by calculating it with the above described formula by using the data input from steps S12 to S16.

The algorithm can use anyone of the data inputs obtained in steps S12, S14, and S16. Particularly, the algorithm may determine the usage of data input depending on whether it obtained in steps S12, S14, and S16, as will be explained in the following:

If the algorithm obtained no data input in step S16, but in steps S12 and S14, it may use the data input obtained in the later steps for the determination of the number of power modules to be used for reactive power compensation. The number of power modules determined in this way may be constant.

If the algorithm obtained a data input in step S16, and also in steps S12 and S14, the data inputs obtained in steps S12 and S14 may be used as a starting points for the reactive power compensation, i.e. the algorithm may calculate an initial number of power modules to be used for an initial reactive power compensation from the data inputs obtained in steps S12 and S14 and may further adjust the number of modules and the reactive power compensation based on the data input obtained in step S16, for example based on actual measurements of the reactive power and/or power factor.

If the algorithm obtained only a data input in step S16 and no data inputs in steps S12 and S14, it may start with an initial configuration, where all power modules are commanded off and no reactive power compensation is performed by the power modules. Then, the algorithm may determine a number of power modules to be used for reactive power compensation and activate the determined number of power modules. The number of power modules may thereafter be adjusted depending on the actual data input obtained in step S16.

Finally, the algorithm controls in step S22 the determined number of power modules, particularly inverters and/or rectifiers of the determined number of power modules for the compensation. For example, the algorithm may generate control signals in step S22 to activate the rectifiers and deactivate the inverters of the determined number of power modules. However, it is also possible to active both the rectifiers and inverters of the determined number of power modules, or to deactivate the rectifiers and to activate the inverters.

At least some of the functionality may be performed by hard- or software. In case of an implementation in software, a single or multiple standard microprocessors or microcontrollers may be used to process a single or multiple algorithms.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An uninterruptible power supply (UPS) system operable in an energy saver mode, comprising:
   a static bypass switch connected between an input connector and an output connector of the UPS system and being activatable to operate the UPS system in the energy saver mode;
   a plurality power modules, each of the plurality of power modules being connected between the input connector and the output connector of the UPS system and at least some of the plurality of power modules being controllable for a reactive power compensation; and
   a controller configured to control one or more of the controllable power modules depending on a data input related to a reactive power compensation, the controller being configured to control one or more of the controllable power modules depending on the data input such that a reactive power flow via the UPS system between a power supply connected to the input connector and a load connected to the output connector is adjusted according to a required reactive power compensation when the UPS system is operated in the energy saver mode, the controller being configured to determine a required reactive power compensation based on the data input and to determine a number of active power modules based on the required reactive power compensation.

2. The system of claim 1, wherein the controller is configured to determine the number of active power modules by rounding up a result of the following equation to a next integer value: number of active power modules=required reactive power compensation/maximum reactive power compensation per power module.

3. The system of claim 1, wherein the data input comprises one or more of the following data:
 a configured reactive load compensation requirement,
 a defined UPS system equivalent capacitance,
 a reactive power on an input side of the UPS system, and/or
 a power factor.

4. The system of claim 3, wherein the controller is configured to calculate a required reactive power compensation based on one or more of the data comprised by the data input.

5. The system of claim 1, wherein at least one of the controllable power modules comprises a reactive power compensation device being controllable by the controller.

6. The system of claim 5, wherein the reactive power compensation device comprises a rectifier and an inverter connected in series between the input connector and the output connector of the UPS system, at least one of the rectifier and the inverter being controllable by the controller.

7. The system of claim 1, further comprising a measurement unit configured to measure the reactive power flow via the UPS system and/or a power factor of the system comprising the UPS system and a load connected to the output connector of the UPS system.

8. A method for operating the uninterruptible power supply (UPS) system of claim 1 in the energy saver mode, comprising the steps of:
 obtaining data for determining a required reactive power compensation;
 determining the required reactive power compensation depending on the obtained data;
 determining a number of power modules of the UPS system for the determined required reactive power compensation; and
 controlling the determined number of power modules for achieving the determined required reactive power compensation.

* * * * *